United States Patent [19]

Pierce et al.

[11] 4,004,335
[45] Jan. 25, 1977

[54] METHOD OF MAKING CLUTCH PULLEY

[75] Inventors: William C. Pierce; Samuel M. Berry, both of Dallas; Arthur D. Johnson, Carrollton, all of Tex.

[73] Assignee: Pitts Industries, Inc. (Entire), Dallas, Tex.

[22] Filed: Nov. 11, 1975

[21] Appl. No.: 630,886

[52] U.S. Cl. .............................. 29/159 R; 74/230.8; 113/116 D
[51] Int. Cl.² .......................................... B21K 1/42
[58] Field of Search ................ 29/159 R, 417, 505; 74/230.8, 230.3; 113/116 D

[56] References Cited

UNITED STATES PATENTS

| 2,620,675 | 12/1952 | Meadows et al. | 29/159 R X |
| 2,646,689 | 7/1953 | Maher | 74/230.8 |
| 2,787,914 | 4/1957 | Nelson | 74/230.8 |
| 2,846,893 | 8/1958 | Bagley | 74/230.8 |
| 2,906,134 | 9/1959 | Bagley | 74/230.8 |
| 3,094,881 | 6/1963 | Schultz, Jr. | 29/159 R X |
| 3,134,376 | 5/1964 | Rice | 29/159 R X |
| 3,440,705 | 4/1969 | Johnson | 29/417 X |
| 3,927,450 | 12/1975 | Sommer et al. | 29/558 X |

FOREIGN PATENTS OR APPLICATIONS 373,548  5/1932  United Kingdom ............. 29/159 R Primary Examiner—Victor A. DiPalma
Attorney, Agent, or Firm—Clarence A. O'Brien; Harvey B. Jacobson

[57] ABSTRACT

A clutch pulley assembly primarily designed for use with electromagnetic type clutches for driving air conditioning compressors on automobiles and the like wherein the component parts of the clutch pulley assembly are fabricated from stampings with a reduction in the amount of machining required to complete the device. Another feature is the flexibility permitted by using a central hub structure with different sized pulley grooves. The method of making and assembling the structure is also part of the invention.

12 Claims, 13 Drawing Figures

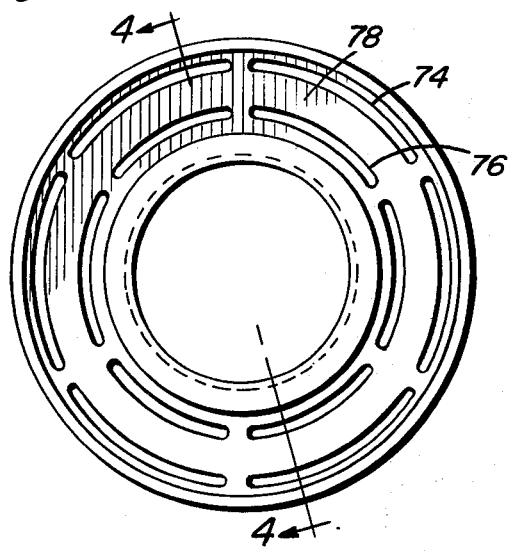
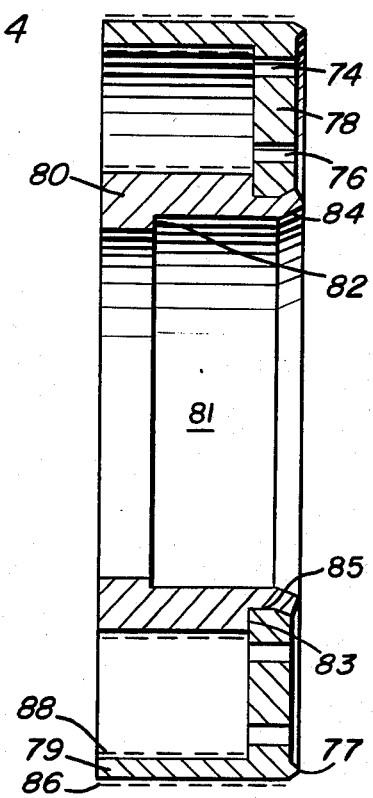
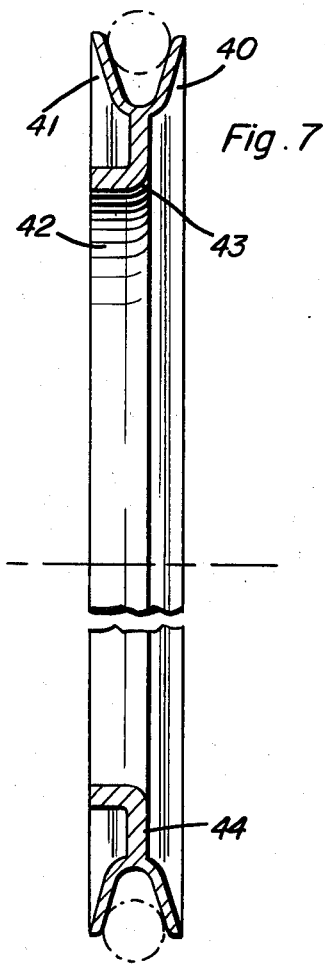
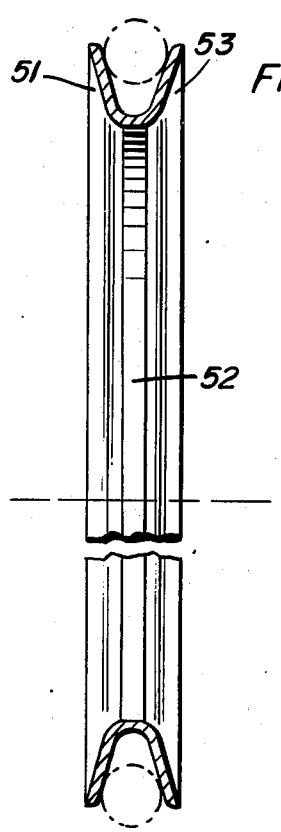
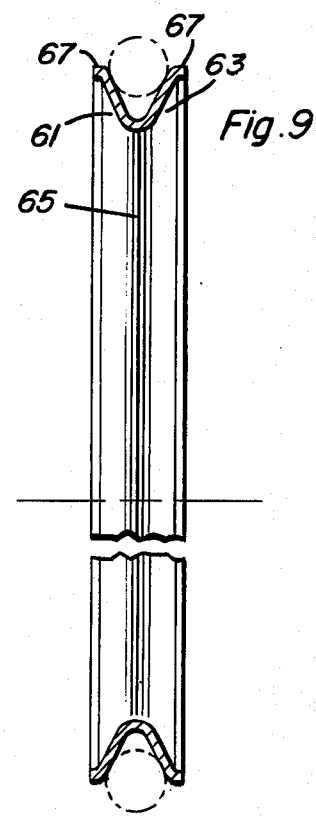

METHOD OF MAKING CLUTCH PULLEY

BACKGROUND OF THE INVENTION

This invention relates generally to a new method of fabricating electric clutch pulley assemblies to reduce the cost of materials and labor. Electric clutches with pulleys thereon are normally used for driving air conditioner compressors in vehicles, such as automobiles, trucks, boats, airplanes, etc.

DESCRIPTION OF THE PRIOR ART

In the past in constructing electromagnetic clutch pulleys for automotive air conditioner compressors and the like such structures have been made from steel forgings requiring an extensive amount of machining in order to meet the critical dimensions as required for a useful product. The forgings themselves are relatively expensive, and the cost of machining same even more so.

The known prior art pulley structures which are fabricated from stampings, etc., are not normally designed to the critical size and dimensional limitations as are required by pulley structures to be used with electromagnetic clutches. These clutches in automotive air conditioner compressor applications and the like rotate at extremely high speeds and require very close adherences to size tolerances. Known prior art devices which may be pertinent to this invention are listed as follows:

U.S. Pat. Nos.:
- 2,074,199 — Mar. 16, 1937
- 2,095,025 — Oct. 5, 1937
- 2,646,689 — July 28, 1953
- 2,787,914 — Apr. 9, 1957
- 2,846,893 — Aug. 12, 1958
- 2,906,134 — Sept. 29, 1959
- 2,995,044 — Aug. 8, 1961
- 3,094,881 — June 25, 1963
- 3,722,309 — Mar. 27, 1973.

SUMMARY OF THE INVENTION

An object of the present invention is a new method of fabricating an electric clutch pulley assembly to reduce cost of materials and labor.

Another object of the present invention is to provide a clutch pulley assembly which eliminates the high cost of steel forging and provides a basic assembly for use with various sizes of die made pulley grooves, thus reducing manufacturing inventory and yet providing a large range of sizes available from stock.

Another object of this invention is to eliminate high priced forging components for an electric clutch pulley assembly and use fabricated components from sheet steel or tube for all the parts of said assembly.

A further object of this invention is to provide an electric clutch pulley assembly fabricated from sheet steel or tube which has the same magnetic properties as a solid pulley machined from a solid casting or forging.

A still further object of this invention is to fabricate a clutch pulley assembly which has less weight than similar pulleys from casting or forging which is important on automobile and airplane applications where weight is a problem.

A still further object of this invention is the method of making and assembling the clutch pulley assembly to achieve the objects aforesaid.

These and other objects are achieved according to the present invention by fabricating the components of the electric clutch pulley assembly from sheet steel or tubing, rather than making the components from a steel forging or casting, which necessarily requires extensive machining in order to reach the desired dimensional characteristics as required for this critical type application with an electric clutch.

Electric clutches for automotive and other vehicle air conditioner compressor use operate at very high rotational speeds so require that their size dimensions be quite exact. Also, the dynamic balancing of such assemblies is important because of high rotational speeds and imbalance of any of the components will cause heavy vibration which is or can be dangerous, or at the very least quite annoying. Reference is herein made to U.S. Pat. No. 3,842,378 of Oct. 15, 1974, wherein an electric clutch pulley assembly is fully disclosed and explained. As disclosed in this patent, the present type of pulley is machined from a low carbon steel forging which is machined all over leaving little more than half its original weight. In this type of manufacture, even though highly automative turning equipment is used, the large amount of machining is expensive and wasteful. Even the cost of tool inserts is significant. The new way to manufacture this electric clutch pulley assembly is as disclosed in this invention by eliminating the high priced forging all together, and fabricating the assembly from tubing and sheet steel. It has been discovered that a substantial weight reduction is achieved, a reduction in cost and time is achieved and the resulting structure has the same desirable magnetic properties of the solid pulley formerly used. This being important for proper performance as an electric clutch in the application set forth above.

These together with other objects and advantages will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a plan view, reduced in size, of the hub, flange and housing parts as assembled according to this invention.

FIG. 4 is a cross-sectional view taken generally along line 4—4 of FIG. 3.

FIG. 7, FIG. 8 and FIG. 9 are cross-sectional views of various pulley grooves according to the invention herein.

DESCRIPTION OF THE PREFERRED EMBODIMENT

Figure 2:
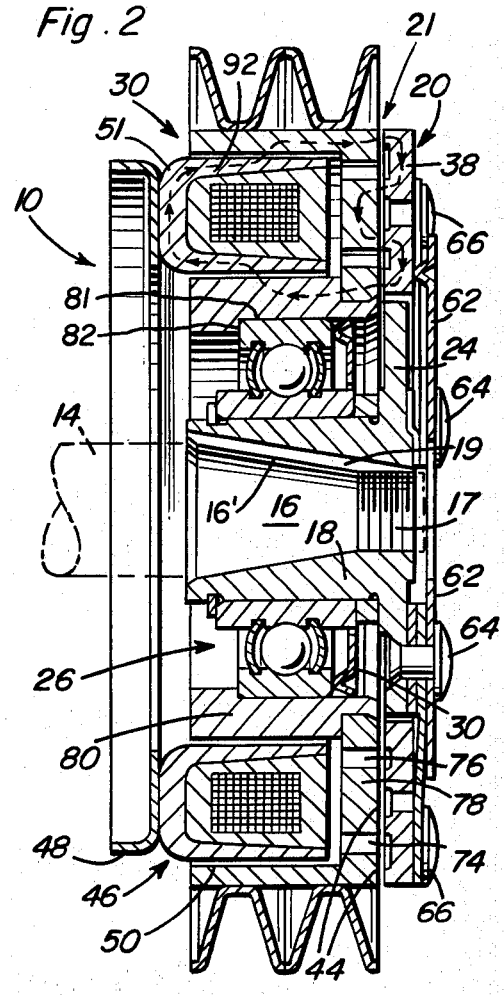
FIG. 2 is a cross-sectional view taken generally along line 2—2 of FIG. 1.

Referring now to the drawings in detail, the clutch pulley assembly of the present invention generally referred to in FIG. 2 by reference numeral 10, is adapted to transmit power from a power source, such as a vehicle engine, to a vehicle accessory load, such as an air conditioner compressor, not shown. The power shaft 14 of the compressor accordingly extends into the clutch assembly and is provided with a tapered end portion 16 which is held assembled to the hub by means of the thread 17 and a suitable lock nut, now shown, threaded on the end thereof. A key (not shown) is also provided in suitable keyways 16' and 19 to lock hub part 18 to shaft 14. Mounted on the hub 18 is a bearing assembly 26 for rotationally supporting the drive pulley assembly 30 which is the structure of this invention. The pulley assembly 30 is adapted to be drivingly connected to the vehicle engine by a pulley belt, not shown, and the pulley assembly 30 forms part of the clutch mechanism 10 together with an armature assembly 20.

The pulley assembly 30 is rotatably mounted on the hub 18 by the bearing assembly 26 in fixed axially spaced relationship to the armature assembly 20 in order to form an axial air gap 21 therebetween. The armature assembly includes a radially outer, axially displaceable portion 38 that is displaceable axially into engagement with a friction end face 44 on the pulley assembly 30 by means of an electromagnetic coil assembly 46 which is fixedly mounted by the frame 48 bolted to the housing of a compressor. The coil assembly 46 projects into an annular cavity 50 formed in the pulley assembly 30 and is of a conventional construction. The electromagnetic coil assembly is energized in a manner well known by those skilled in the art whenever the vehicle engine is in operation and when so energized generates a magnetic field 92 that extends from its casing 51 made of material having a low magnetic reluctance property. The pulley assembly 30 is also made of material having low magnetic reluctance in order to permit the establishment of magnetic fields therein. Also, the axially displaceable portion 38 of the armature assembly is made of a material having a low magnetic reluctance.

The displaceable portion 38 of the armature 20 is coupled to the mounting flange portion 24 by means of a plurality of leaf springs 62 pivotally connected at opposite ends by connectors 64 to the radial outer portion of the mounting flange 24 on one axial side and by means of pivot connectors 66 to the radially inner portion of the movable disc portion 38 on the same axial side. The leaf spring elements 62 will therefore yieldably resist actual movement of the movable disc portion 38 into engagement with the pulley assembly 30 until such time as electromagnets 46 are energized. For more details of this structure, reference is made to U.S. Pat. No. 3,842,378. Like reference numerals are used herein to correspond with those in said patent.

The pulley assembly 30 has a flanged web portion 78 which has circumferential slots 76 and 74 therein to magnetically separate radially inner and outer portions of this web portion of the pulley assembly.

When the electromagnetic assembly is energized the magnetic field produced thereby, which is characterized by the flux path 82 as shown in FIG. 2, extends through the material of the components of the pulley assembly 30 and through the armature disc portion 38. Note, that as shown in FIG. 2, the disc portion 38 is shown separated (gap 21) from the friction surface 44 of the web flange portion 78 which is the position when the flux is not present, i.e., electromagnets are not energized. Obviously, once the electromagnets are energized and flux path 92 occurs, the armature disc 38 will be in firm frictional contact with member 78 and friction surfaces 44 and gap 21 will not be present.

The new and improved clutch pulley assembly of this invention will now be described. The flange web portion 78 (FIG. 4) of the over-all pulley assembly 30 is formed from a disc of sheet steel by means of a press and die arrangement. The present press and die arrangement is such that a sharp corner 77 is generally left when the flange portion 79 is formed from the main web member 78. This flange portion 77 is later machined off so that a greater friction face 44 will be exposed for contact with the clutch armature 38. The center hub 80 is made from long tubing which is sliced or cut into appropriate short sections and then the inner surface of each section is machined to produce the recess portion 81 and the abutment 82. Another recess portion 85 with another abutment 83 is provided on the same end as the recess 81 but on the outside of the tube 80. The web-flange assembly 78, 79 is then mounted on the tube hub 80 and die staked to the hub by die swaging all around the reduced edge thereof as shown at 84. This has proven to be a very strong and magnetically efficient joint. After the step of die swaging, the slots 74 and 76, that define the pole areas of the magnetic clutch, are punched out of the member 78. This punching step does cause a slight distortion of the flange portion 79 and therefore a machining step of the flanges outside diameter and inside diameter is required. This is indicated by the dotted line portions marked 86 and 88 in FIG. 4. This machining, of course, does not require the heavy machinery previously required for making the entire pulley structure from forgings.

Once the outer surface of the flange member 79 has been machined to a very close tolerance, then pulley grooves, such as shown in FIGS. 7, 8 and 9, are assembled thereon. Normally the clutches have pulley grooves of six inch and seven inch diameter for application to various models of automobiles. One groove is normally used, but two are generally provided to minimize stocking of several models. A groove having a 60° belt receiving portion is also much used with foreign cars, while American automobiles generally use in the range of 36°. The hub and flange assembly of FIGS. 3 and 4 is usable with all of the pulley grooves of various sizes and dimensions. Thus, a standard hub assembly is manufactured according to this invention which is utilizeable with various pulley grooves in order to reduce stock inventory and flexibility of total assembly.

The pulley grooves shown can be made by several methods of fabricating sheet metal. Spinning, splitting or rolling are acceptable means. The groove, as shown in FIG. 9, has been made by a splitting process with the internal web removed. This discarded web portion can be used for other parts, such as the bearing retainer, thus providing an over-all reduction of expense with this invention. The portion 65 of the pulley groove of FIG. 9 is just slightly smaller in diameter than the machined portion of flange 79 so that a press fit is required in the assembly process. Once the pulley groove is pressed upon the flange member, it is then staked or welded. It has been discovered that if any looseness if present between the pulley groove and the outer surface of the flange even with stacking or spot welding, in actual operation the welds will fatigue and fracture rendering the over-all device useless. No failures have occurred in tests with grooves that have been press fitted as in this invention before staking or welding.

Figure 5:
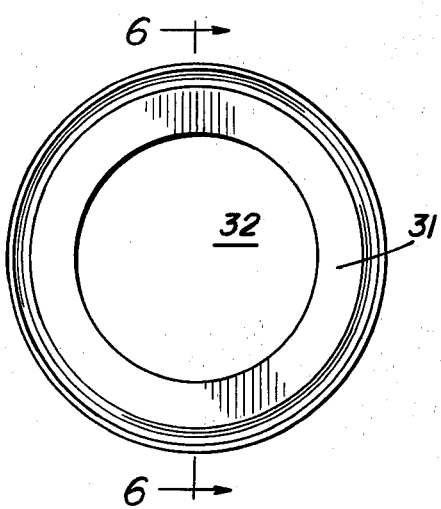
FIG. 5 is a plan view of the combination grease retainer and bearing retainer.
Figure 6:
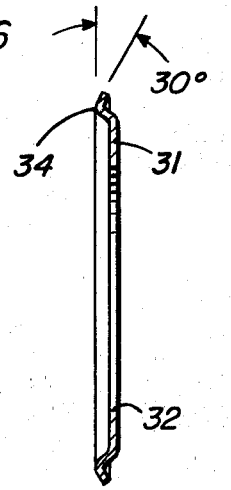
FIG. 6 is a cross-sectional view taken along line 6—6 of FIG. 5.
Figure 10:
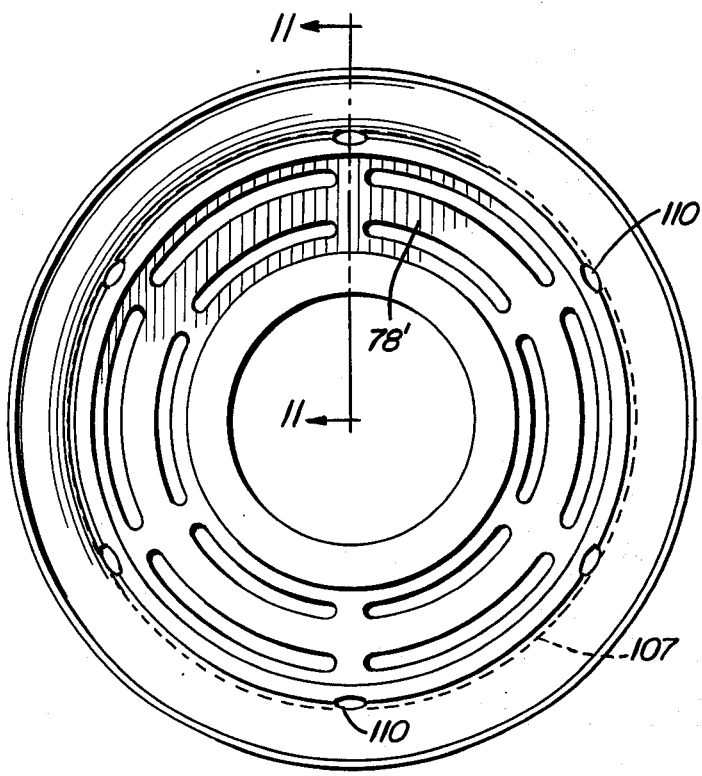
FIG. 10 is a side view of a modified embodiment of the invention.
Figure 11:
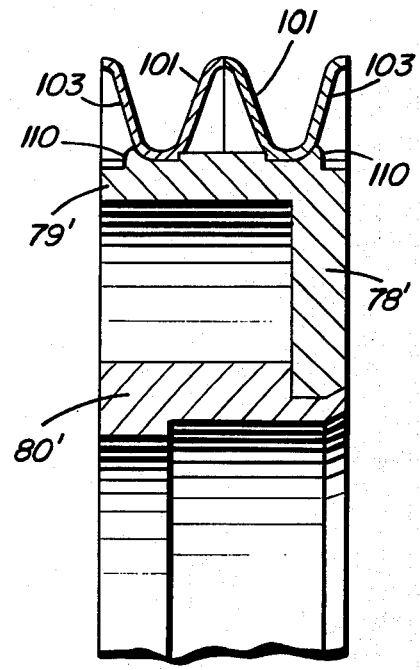
FIG. 11 is a cross-sectional view taken along line 11—11 of FIG. 10.
Figure 12:
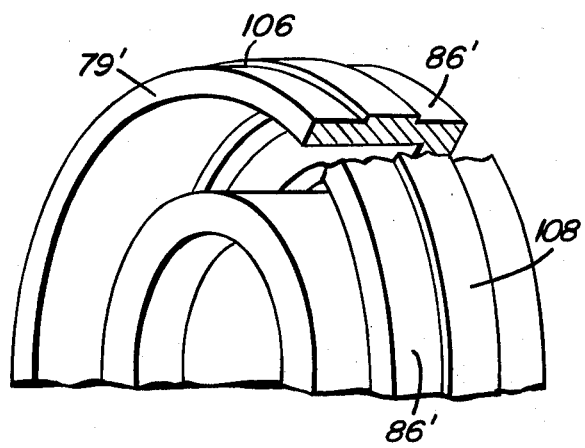
FIG. 12 is a perspective view, in part, of the hub, flange and housing for the embodiment of FIG. 10.
Figure 13:
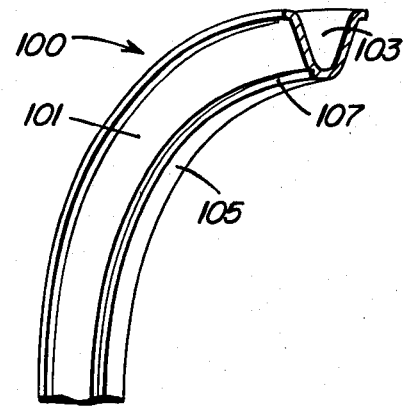
FIG. 13 is a perspective view, in part, of a pulley flange for the embodiment of FIG. 10.

FIGS. 5 and 6 show a combination grease retainer and bearing retainer. It is assembled when the bearing is pressed into the recessed inner portion 81 of the hub 80. This retainer comprises an annular member 30 having a large hole therein 32 and a recessed dipped flange portion 34 with the outer edge making an angle of approximately 30° from the vertical as seen in FIG. 6. As shown in FIG. 2, this retainer locks the bearing 26 in the hub 80 within the recess portion 81 by means of a press fit and spring force action of lip 34. It holds the bearing 26 against the shoulder 82 formed by the recess portion 81 and also acts to retain any grease that may purge from the seal from migrating to the friction surface 44. This is an improvement over former designs wherein a separate grease retainer cup is inserted, then the bearing, and finally the bearing retainer at the other end.

Figure 1:
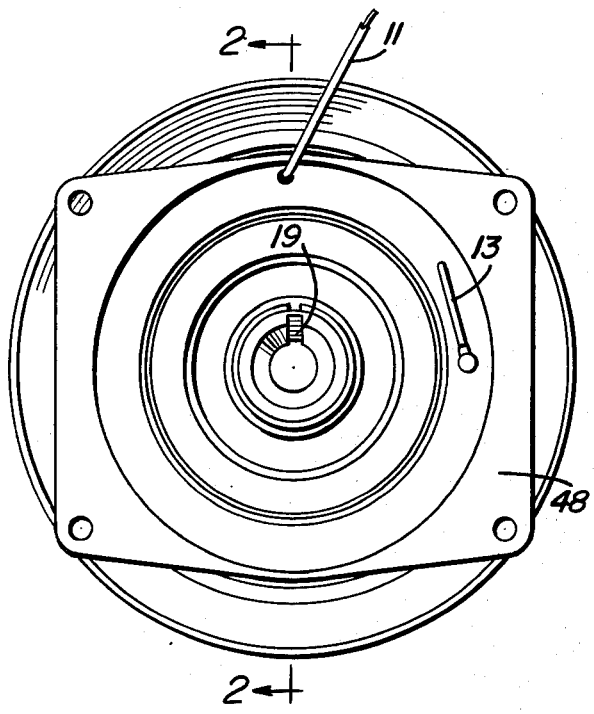
FIG. 1 is an end view of an electric clutch pulley assembly in reduced size according to the present invention.

FIG. 1 shows the electrical connecting wires 11 and 13 for the electromagnets of the over-all clutch assembly and the support plate 48 for attachment of the assembly to a compressor housing. The keyway 19 in the hub 18 is also clearly shown.

The pulley groove of FIG. 7 may be made from an annular plate-like stamping of sheet metal which is rotated and while being rotated the peripheral edge is slit, and then the slit portions are parted at each side of the slit to form flanges 40 and 41. The two flanges are usual reformed during the slitting operation to provide the desired groove configuration and also to provide rim portions 67, such as shown in FIG. 9, if these rims are desirable. After the pulley groove itself is formed, then the central aperture is pressformed to produce the inner flange 42 and the tapering portion 43. The size of the inner flange portion 42 is just slightly smaller than the machined outer surface of the housing flange 79 so that when the pulley groove is pressed onto the outer hub housing flange, there will be a tight fit for the reasons described above. As mentioned previously, spinning or rolling are also acceptable methods for making the pulley grooves of FIGS. 7, 8 and 9. The important criteria being the shape of the inner portion of the flanges for receiving the V-belt or other type belt and the inner diameter 42, 52 or 65 which must fit tightly on flange 79 prior to welding or staking to complete the clutch pulley assembly.

FIGS. 10–13 show a modified embodiment of the invention, wherein parts corresponding to the ones in FIGS. 3 and 4 have the same reference numerals with a prime thereafter.

The modification is in the machining of flange 79' at 86' to leave a slight circumferential projection 108 to provide a ridge 106 on each side for engagement with a groove 107 in the modified pulley groove 100.

The modified pulley groove 100 may be fabricated like the ones described above for FIGS. 7, 8 and 9, with the additional steps of machining the inner surface 105 for a very tight press fit with outer surfaces 86' of the flange member, and with the further step of cutting or machining the groove 107 on one of the sides (101) of the pulley groove. The other side 103 need not be so grooved, since only one groove is needed to ride over and about the ridge 106 and projection 108.

After these pulley grooves 100 are press fitted to the flange member 79', both sides are die staked as at 110 to lock the grooves in place and to complete the assembly. This modification completely eliminates welding.

Thus it is seen that these parts fabricated from sheet steel and of metal having good magnetic properties when assembled in the manner disclosed herein produce a clutch pulley assembly for electromagnetic type clutch devices which is new and unique to the field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A method of making a clutch pulley assembly for an electromagnetic clutch comprising the following steps;
    a. cutting a short section of tubing from a long piece of tubing to form the hub portion of said assembly,
    b. machining one end of said short section of tubing to have an undercut outer edge,
    c. press forming an annular disc of metal with a central aperture therein to have an outer flange extending substantially perpendicular from the outer edge of said disc,
    d. mounting the aperture of said disc on the undercut edge of said tubing section, and
    e. die swaging the end of said tubing section so that the hub section and disc become integral and make a good strong and magnetically efficient joint.

2. The method as set forth in claim 1 wherein step (c) includes the additional step of punching out annular slots in the disc for the purpose of providing barriers to the flow of magnetic flux lines in said disc.

3. The method as set forth in claim 2 wherein step (c) further includes the additional step of machining the outer surface of the perpendicularly extending flange to reduce the outer circumference thereof to a desired size for receiving accurately sized pulley grooves thereon and also removing by machining any projecting lip at the outer corner of the disc and flange formed by the pressing step so that the surface of the disc will have a greater frictional contact area.

4. The method as set forth in claim 3 including the additional step of press fitting at least one accurately formed pulley groove on the outer machined flange surface.

5. The method of claim 4 including the further additional step of welding the contact joint between the pulley groove and the hub flange member.

6. The method as defined in claim 5 wherein step (a) includes the additional step of undercutting the inner surface of the tube section by machining to provide a proper dimension surface for reception of a bearing therein and with an abutment to limit the position of the bearing.

7. The method set forth in claim 3 together with the additional steps of cutting another annular disc from steel having good magnetic properties, rotating said annular disc and splitting the peripheral edge thereof, separating the split portions and forming flanges thereon, press forming the inner portion of the annular disc to have a perpendicularly extending flange thereon, and press fitting the inner surface of said flange over the outer machined flange surface of the main hub assembly.

8. The method of claim 3 together with the additional step of forming a pulley groove by the process of rolling, and the further step of press fitting the pulley groove over the outer machined flange surface of the main hub assembly.

9. The method of claim 3 together with the additional step of forming a pulley groove by the process of spinning, and the further step of press fitting the pulley groove over the outer machined flange surface of the main hub assembly.

10. A method of making a clutch pulley assembly for use in an electromagnetic clutch comprising;
   a. the step of cutting a short section of tubing from a long tube of steel having desirable magnetic properties,
   b. the step of machining said short section of tubing to have an undercut ridge on the outer surface of one end and an undercut inner surface extending from the same end but stopping short of the other end to leave a bearing retaining ridge within the inner surface of said tube,
   c. cutting a disc from sheet steel having desirable magnetic properties,
   d. punching a central aperture in said disc,
   e. press forming said disc to produce an annular flange portion thereon at the outer edge thereof and extending substantially perpendicular thereto,
   f. mounting the central aperture of said disc on the outer undercut edge of said tube section,
   g. die swaging the end of said tube section so that the tube section and disc are integral to produce a good magnetically efficient joint,
   h. punching annular slots in said disc to form magnetic flux barriers,
   i. machining the inner and outer surfaces of the flanged portion extending from said disc and the outer surface of said tube section so as to produce a hub assembly having the desired accurate dimensions,
   j. fabricating a pulley groove from sheet steel, and
   k. press fitting said pulley groove upon the outer flanged surface of said hub assembly.

11. The method of claim 4 including the further additional step of die staking the pulley groove to the hub flange member.

12. The method as defined in claim 11 wherein step (a) includes the additional step of undercutting the inner surface of the tube section by machining to provide a proper dimension surface for reception of a bearing therein and with an abutment to limit the position of the bearing.

* * * * *